United States Patent
Bell et al.

(10) Patent No.: US 10,699,122 B2
(45) Date of Patent: Jun. 30, 2020

(54) ALERTING A HYPER FOCUSED DEVICE USER TO ENGAGE AUDIENCE

(71) Applicant: INTERNATIONAL BUSINESS MACHINES CORPORATION, Armonk, NY (US)

(72) Inventors: Denise A. Bell, Austin, TX (US); Jana H. Jenkins, Raleigh, NC (US); Jeffrey A. Kusnitz, Campbell, CA (US); Adriana A. Morales, Austin, TX (US)

(73) Assignee: International Busines Machines Corporation, Armonk, NY (US)

(*) Notice: Subject to any disclaimer, the term of this patent is extended or adjusted under 35 U.S.C. 154(b) by 0 days.

(21) Appl. No.: 16/144,925

(22) Filed: Sep. 27, 2018

(65) Prior Publication Data

US 2020/0104596 A1 Apr. 2, 2020

(51) Int. Cl.
*H04N 5/232* (2006.01)
*G06K 9/00* (2006.01)
*G06T 7/70* (2017.01)
*G08B 21/22* (2006.01)

(52) U.S. Cl.
CPC ..... *G06K 9/00671* (2013.01); *G06K 9/00228* (2013.01); *G06K 9/00288* (2013.01); *G06K 9/00771* (2013.01); *G06T 7/70* (2017.01); *G08B 21/22* (2013.01); *H04N 5/232* (2013.01); *G06T 2207/30201* (2013.01); *G06T 2207/30232* (2013.01)

(58) Field of Classification Search
CPC ............... H04N 5/232; G06K 9/00672; G06K 9/00228; G06K 9/00288; G06K 9/00771; G06T 7/70; G06T 2207/30232
USPC .......................................................... 348/143
See application file for complete search history.

(56) References Cited

U.S. PATENT DOCUMENTS

| 6,934,560 | B2 | 8/2005 | Chuang | |
|---|---|---|---|---|
| 8,024,330 | B1 | 9/2011 | Franco et al. | |
| 9,600,688 | B2 | 3/2017 | Buck | |
| 9,809,167 | B1* | 11/2017 | Badger, II | B60Q 9/008 |
| 9,975,483 | B1* | 5/2018 | Ramaswamy | B60Q 11/00 |

(Continued)

FOREIGN PATENT DOCUMENTS

CA 2564912 C 6/2011

OTHER PUBLICATIONS

Anonymous, "A System for Automatically Assessing Personal Appearance," An IP.com Prior Art Database Technical Disclosure, Sep. 24, 2014, p. 1-4, IP.com Number: IPCOM000238903D.

(Continued)

*Primary Examiner* — Michael Lee
(74) *Attorney, Agent, or Firm* — Rakesh Roy

(57) ABSTRACT

A method, computer system, and a computer program product for diverting a user focus from a user device is provided. The present invention may include detecting a user audience in proximity of a user device. The present invention may then include determining that a user of the user device should be alerted to the detected user audience. The present invention may further include, in response to determining that the user of the user device should be alerted to the detected user audience, transmitting an alert from the user device configured to divert a user focus from the user device to the detected user audience.

17 Claims, 6 Drawing Sheets

(56) References Cited

U.S. PATENT DOCUMENTS

| | | | |
|---|---|---|---|
| 2011/0111724 A1* | 5/2011 | Baptiste | H04M 1/6075 |
| | | | 455/404.1 |
| 2012/0032806 A1* | 2/2012 | Lee | H04M 1/72577 |
| | | | 340/573.1 |
| 2012/0052808 A1 | 3/2012 | McMeans | |
| 2012/0262582 A1* | 10/2012 | Kimchi | H04M 1/72569 |
| | | | 348/159 |
| 2014/0031080 A1 | 1/2014 | Daar | |
| 2014/0273912 A1 | 9/2014 | Peh et al. | |
| 2016/0148247 A1* | 5/2016 | Li | G06Q 30/0251 |
| | | | 705/14.41 |

OTHER PUBLICATIONS

Mell et al., "The NIST Definition of Cloud Computing," National Institute of Standards and Technology, Sep. 2011, p. 1-3, Special Publication 800-145.

\* cited by examiner

ALERTING A HYPER FOCUSED DEVICE USER TO ENGAGE AUDIENCE

BACKGROUND

The present invention relates generally to the field of computing, and more particularly to mobile device user interfaces.

With the ever-increasing popularity of mobile devices and the corresponding applications and tools, users tend to be hyper focused on the mobile device at hand and lose track of the user surroundings. As such, it has become difficult for an audience to get the attention of, and engage in face-to-face communication with, a user absorbed in digital interactions with a user device.

SUMMARY

Embodiments of the present invention disclose a method, computer system, and a computer program product for diverting a user focus from a user device. The present invention may include detecting a user audience in proximity of a user device. The present invention may then include determining that a user of the user device should be alerted to the detected user audience. The present invention may further include, in response to determining that the user of the user device should be alerted to the detected user audience, transmitting an alert from the user device configured to divert a user focus from the user device to the detected user audience.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
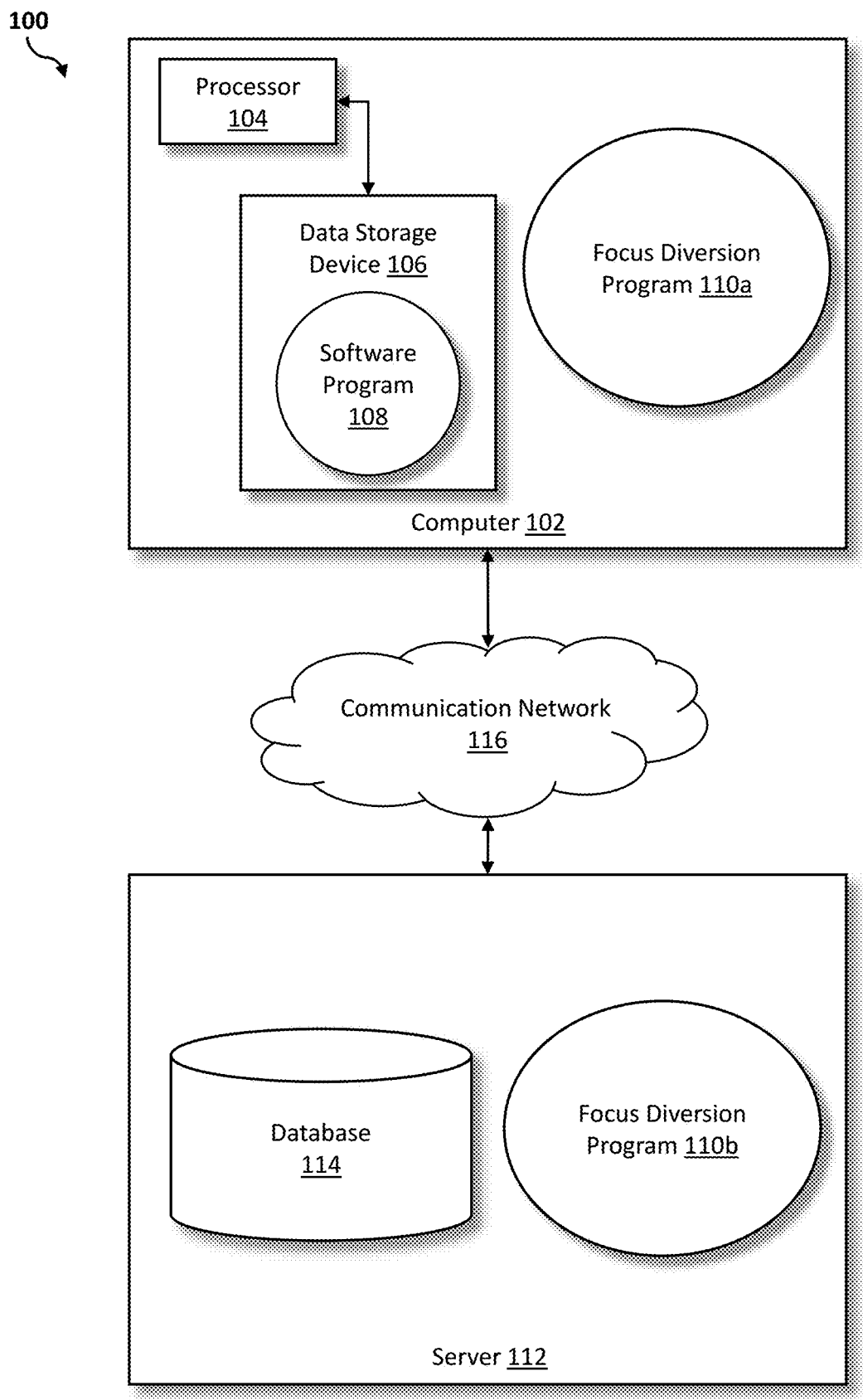
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for diverting/directing a focus of a user from digital interactions with a mobile device to an in-person interaction with someone (e.g., a user audience) seeking the attention of the user. As such, the present embodiment has the capacity to improve the technical field of mobile device user interfaces by providing user interface mechanisms for alerting the user of the mobile device to a user audience in proximity of the user when the user audience is seeking to engage the user in face-to-face communication. More specifically, a user audience may be detected when eye contact (e.g., focal attention) from a potential user audience is directed towards the user and/or the mobile device of the user for a configurable duration of time. In response, one or more alerts or indications may be generated in the mobile device to divert the focus of the user from the mobile device to the user audience seeking the attention of the user. Further, facial recognition techniques may be implemented to recognize a face in the user audience to determine whether alerts or indications may be generated in the mobile device to divert the focus of the user from the mobile device to the recognized user audience seeking the attention of the user.

As described previously, with the ever-increasing popularity of mobile devices and the corresponding applications and tools, users tend to be hyper focused on the mobile device at hand and lose track of the user surroundings. It has become difficult for an audience to get the attention of, and engage in face-to-face communication with, a user absorbed in digital interactions with a mobile device.

Therefore, it may be advantageous to, among other things, provide a way to alert a user who is hyper focused in digital interactions with a mobile device that a user audience is seeking attention and face-to-face engagement.

According to at least one embodiment, a focus diversion program may be provided to enable the audience to trigger an alert for diverting the attention of the hyper focused device user from the mobile device to the user audience. The mobile device running the focus diversion program may be constantly looking ahead of the user using a front-facing camera of the mobile device (e.g., camera on the back side of the mobile device). When the focus diversion program detects that someone is making eye contact with the user and/or the mobile device for a configurable period of time, the focus diversion program may implement the user interface of the mobile device to alert the user. Appropriate alerting mechanisms may include, but may not be limited to, vibrating the mobile device, emitting an audio alert from the mobile device, displaying a video indicator on the mobile device, or displaying a popup window on the mobile device.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a focus diversion program 110a. The networked computer environment 100 may also include a server 112 that is enabled to run a focus diversion program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the focus diversion program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the focus diversion program 110a, 110b (respectively) to receive one or more alerts to direct the focus of the user to an audience when a focal attention or eye gaze of the audience is detected on the user using a camera of the client computer 102 or the server computer 112. The focus diversion method is explained in more detail below with respect to FIGS. 2 and 3.

Figure 2:
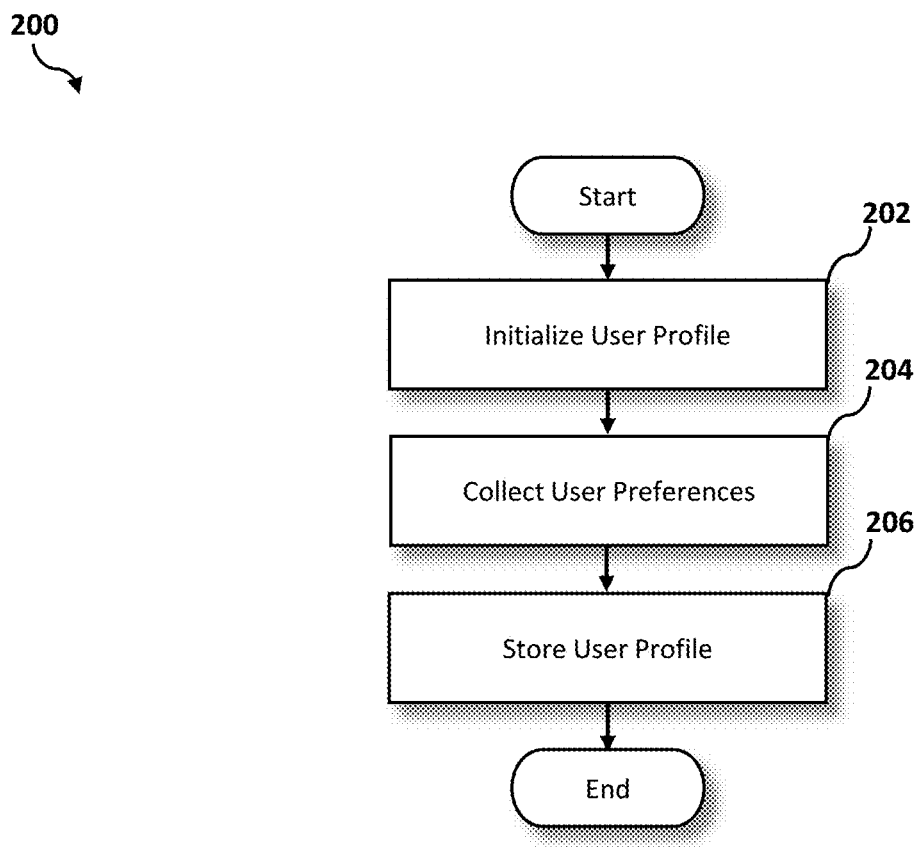
FIG. 2 is an operational flowchart illustrating a process for the focus diversion user registration according to at least one embodiment.

Referring now to FIG. 2, an operational flowchart illustrating the exemplary focus diversion user registration process 200 used by the focus diversion program 110a, 110b according to at least one embodiment is depicted.

At 202, a user profile is initialized. Using a software program 108 on a user device (e.g., mobile device, client computer 102), a user profile corresponding with the user of the user device may be initialized. The initialized user profile may be a data file for storing one or more images, user preferences, and other relevant data. The user profile may be implemented as a data structure with fields containing user data or pointers to user data. In one embodiment, the user may interact with the user device and start the focus diversion program 110a, 110b. The focus diversion program 110a, 110b may automatically present the user with the option to create a new profile if none is found or may display a button or other way for the user to indicate a desire to create a new user profile. Once the user affirmatively indicates (e.g., via interacting with the mobile device) a desire to create a user profile, a new data structure (e.g., an array) may be initialized for the user profile.

For example, the user running the focus diversion program 110a, 110b on the mobile device of the user clicks an application icon for the focus diversion program 110a, 110b to start the focus diversion program 110a, 110b. The focus diversion program 110a, 110b does not detect a user profile associated with the mobile device and automatically presents the user with a profile registration dashboard including a "New User" button. The user clicks the "New User" button to affirmatively indicate a desire to create a user profile and, in response, the focus diversion program 110a, 110b initializes a new data structure for a new user profile.

Then, at 204, user preferences are collected. After initializing the user profile at 202, the focus diversion program 110a, 110b may collect user preferences by presenting questions to the user that the user may reply to, for example, by entering text or selecting from a predetermined list of answers. In one embodiment, the focus diversion program 110a, 110b may present a question to determine one or more user-defined alerting mechanisms. The user-defined alerting mechanisms may include, a haptic alert (e.g., vibrating the mobile device), an audio alert (e.g., emitting a beeping sound from the mobile device), a visual or video indicator or alert (e.g., flashing the screen of the mobile device), or any other suitable user interface alert (e.g., displaying a popup window on the mobile device). In one embodiment, the focus diversion program 110a, 110b may present a question to determine a user-defined time parameter (e.g., a minimum time duration of the focal attention or eye gaze of the user audience) for triggering the alert. In another embodiment, the focus diversion program 110a, 110b may present a question to determine instances when the alerting mechanisms may be disabled (e.g., no alerts when interacting with E-mail on the mobile device). The user responses and preferences may then be stored using the initialized user profile data structure.

According to one embodiment, the focus diversion program 110a, 110b may also provide a user preference or option for a facial recognition based alerting mechanism. In one embodiment, the focus diversion program 110a, 110b may implement known facial recognition techniques to recognize a face of the user audience and, based on the recognized face, determine whether the user should be alerted. In one embodiment, the focus diversion program 110a, 110b may implement facial recognition to recognize a face of the user audience based on detecting a partial face (e.g., side profile) using the camera of the user device. The focus diversion program 110a, 110b may analyze specific facial points or indicators (e.g., distance between the eyes, distance between the nose and the forehead) in the detected face which may not change with age in order to determine or recognize the particular person in the user audience.

If the user chooses to implement the facial recognition option, the focus diversion program 110a, 110b may provide the user with the option to select one or more people who, if facially recognized by the focus diversion program 110a, 110b, may trigger the alerting mechanism (e.g., user may want to be interrupted by grandfather). In another embodiment, the focus diversion program 110a, 110b may provide the user with the option to select one or more people who, if facially recognized by the focus diversion program 110a, 110b, may not trigger the alerting mechanism (e.g., user may not want to be interrupted by younger sibling). In at least one embodiment, the focus diversion program 110a, 110b may provide the user with the option to select an audience-specific alerting mechanism (e.g., emitting an audio alert from the mobile device if grandparent is detected). In another embodiment, the focus diversion program 110a, 110b may provide the user with the option to select an audience-specific user-defined time parameter for triggering the alert. The user may indicate that a recognized person who may not otherwise trigger the alerting mechanism may trigger the alerting mechanism if the audience-specific user-defined time parameter is met (e.g., user may not want to be interrupted by younger sibling unless the younger sibling was gazing at the user for 20 seconds). In at least one embodiment, the focus diversion program 110a, 110b may provide the user with the option to select whether the alerting mechanism may be triggered by an unidentified (e.g., not facially recognized) user audience.

In order to implement the facial recognition option, the focus diversion program 110a, 110b may collect one or more images (e.g., face images) of the people who may or may not trigger the alerting mechanism, as selected by the user. The focus diversion program 110a, 110b may give the user the option to select preexisting images of the people or the focus diversion program 110a, 110b may access a camera attached to the user device (e.g., a front-facing camera on the mobile device, client computer 102) to collect images of the faces of the people in real time. The user may select preexisting images of the people stored locally on the user device or stored in a cloud environment in a server 112. In one embodiment, the user may link a social network profile to the user profile of the focus diversion program 110a, 110b to allow the focus diversion program 110a, 110b to retrieve images of the people associated with the user (e.g., social network connections or friends) from a social network database (e.g., via an application programming interface (API) of the social network platform). After the images of the faces of the people have been collected, the images (e.g., pointers to the images in the social network database) may be added to the user profile.

Continuing with the previous example, after initializing the new user profile at 202, the focus diversion program 110a, 110b directs the user to a preferences page of the user registration dashboard. In the preferences page, the focus diversion program 110a, 110b presents a text box including a first question, "How should you be alerted?" and a predetermined list of answers including, "vibration," "audio alert," "video indicator," and "popup window." In response, the user interacts with the mobile device and selects "audio alert" as the user-defined alerting mechanism. The focus diversion program 110a, 110b also presents a second question, "What time length of focal attention or gaze should trigger the alert?" and a predetermined list of answers including, "five seconds," "ten seconds," and "fifteen seconds." The focus diversion program 110a, 110b also provides a text field for a custom time length. In response, the user interacts with the mobile device and selects "ten seconds." After receiving the user responses, the focus diversion program 110a, 110b stores the responses using the initialized user profile data structure.

Then, the focus diversion program 110a, 110b provides the user with the option to implement the facial recognition based alerting mechanism and the user interacts with the mobile device to select the facial recognition option. The user then enters the names of the three younger siblings of the user under a "Do not interrupt list." As such, if the focus diversion program 110a, 110b facially recognizes the three younger siblings, the user will not be interrupted. Thereafter, the user selects the option to link a social network profile to the user profile of the focus diversion program 110a, 110b to enable the focus diversion program 110a, 110b to retrieve images of the people associated with the user from a social network database in order to implement the facial recognition. Then, the focus diversion program 110a, 110b adds the retrieved images of the people associated with the user to the user profile.

Next, at 206, the user profile is stored. After the user profile is complete, the focus diversion program 110a, 110b may upload the user profile from the user device (e.g., client computer 102) to a cloud environment (e.g., via communication network 116) for storage on the server 112. On the server 112, the user profile may be stored within a data repository 310 (FIG. 3) of a database 114 which may be accessed by the focus diversion program 110a, 110b.

Continuing with the previous example, the focus diversion program 110a, 110b uploads the complete user profile from the mobile device to the server 112 via communication network 116. Specifically, the focus diversion program 110a, 110b stores the user profile in a data repository 310 within the server 112.

Figure 3:
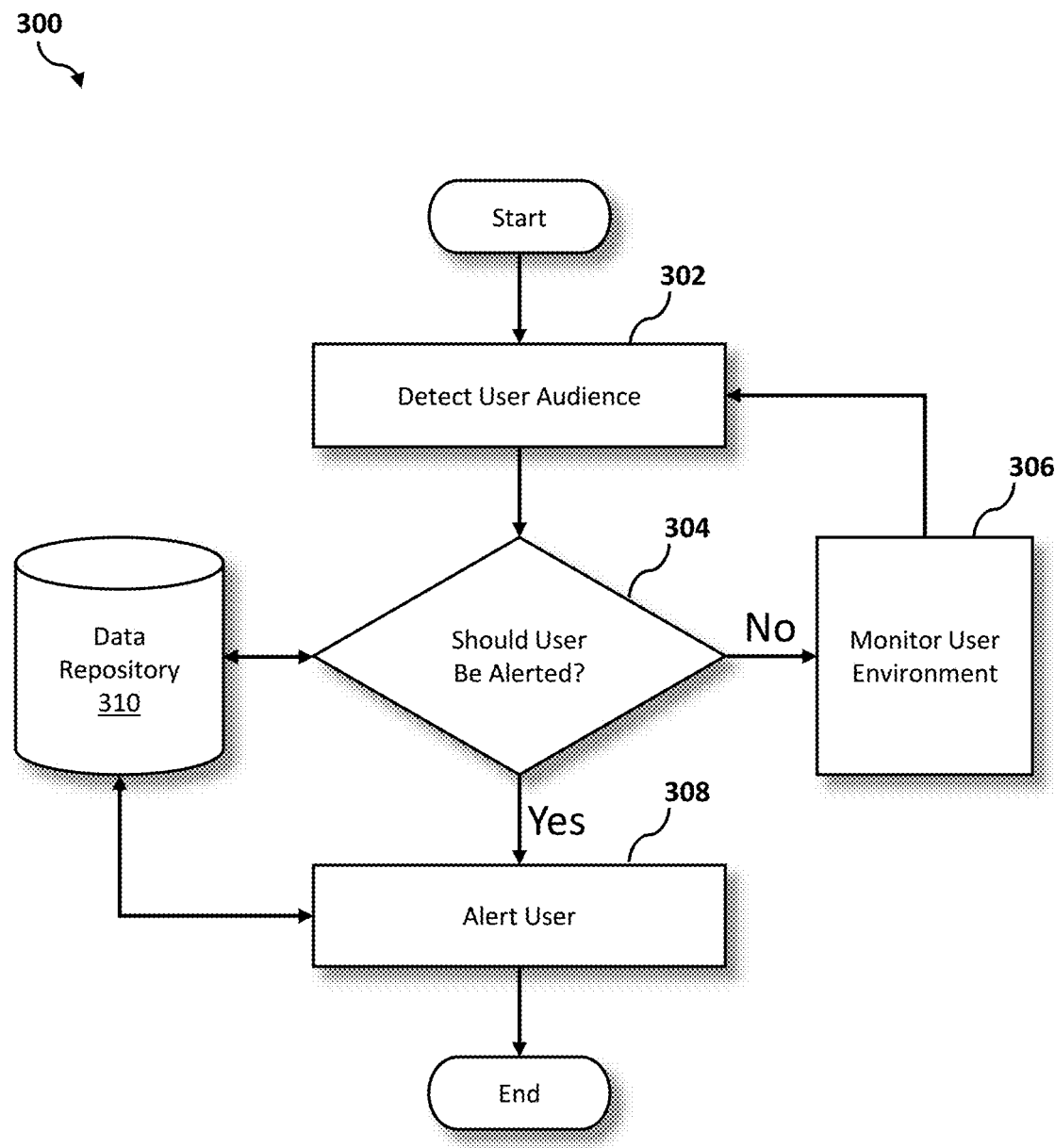
FIG. 3 is an operational flowchart illustrating the exemplary focus diversion process according to at least one embodiment.

Referring now to FIG. 3, an operational flowchart illustrating the exemplary focus diversion process 300 used by the focus diversion program 110a, 110b according to at least one embodiment is depicted.

At 302, a user audience is detected. The focus diversion program 110a, 110b may run in the background of the user device (e.g., client computer 102/mobile device/smart phone) as the user interacts with a different application or program (e.g., software program 108) running simultaneously on the user device (e.g., in the foreground of the user device). While the user is hyper focused or absorbed with digital interactions with the user device (e.g., interacting with a screen on the front side of the mobile device), the focus diversion program 110a, 110b may provide gaze detection capabilities to constantly monitor the environment in front of the user (e.g., look ahead of the user). The gaze detection capabilities may be implemented using a camera associated with the user device. In one embodiment, the focus diversion program 110a, 110b may interact with the camera of the user device (e.g., front-facing camera located on the back side of the mobile device) to determine if a person (e.g., potential user audience) is within the view of the camera of the user device. After a person is detected within the view of the camera of the user device, the focus diversion program 110a, 110b may determine if the person is a user audience based on the focal attention or eye gaze of the person. Since the camera employed by the focus diversion program 110a, 110b may be positioned between the user of the user device and any persons (e.g., potential user audience) detected within the view of the camera (e.g., camera positioned on the back side of the user device), if a person is detected (e.g., via the camera) to be facing straight at the camera affixed to the back side of the user device, the focus diversion program 110a, 110b may determine that the focal attention of the person may be on the user of the user device. As such, the focus diversion program 110a, 110b may detect the person as a user audience of the user. In another embodiment, the gaze detection capabilities of the focus diversion program 110a, 110b may include other techniques, such as identifying the eyes within the face of the person in view of the camera and determining where the person is looking (e.g., gaze of the person) based on the position of the eyes.

Continuing with the previous example, the focus diversion program 110a, 110b runs in the background of the mobile device of the user as the user interacts with a gaming application running simultaneously on the mobile device. While the user is focused on the gaming application on the mobile device, the front-facing camera located on the back side of the mobile device is implemented by the focus diversion program 110a, 110b to constantly monitor the environment in front of the user. As such, when a person X sits down at a table across from the user in view of the front-facing camera, the focus diversion program 110a, 110b determines that the person X is facing straight at the front-facing camera using the gaze detection capabilities of the focus diversion program 110a, 110b. Accordingly, the focus diversion program 110a, 110b determines that person X is a user audience seeking the attention of the user.

Then, at 304, an inquiry is made to determine if the user should be alerted. After detecting the focal attention of the user audience (e.g., gazing at the user), the focus diversion program 110a, 110b may calculate a time duration of the focal attention length of the user audience to determine if the time duration of the focal attention length meets the user-defined time parameter recorded in the user preferences at 204. In one embodiment, the focus diversion program 110a, 110b may trigger a timing component to start a timer when the user audience is detected to be facing straight at the camera of the user device (e.g., gazing at the user) and may trigger the timing component to stop the timer when the user audience is detected to be facing away from the camera of the user device (e.g., gazing away from the user). Thereafter, the focus diversion program 110a, 110b may compare the time duration of the focal attention length calculated by the timing component against the user-defined time parameter to determine if the user should be alerted of the user audience. In one embodiment, the focus diversion program 110a, 110b may interact (e.g., via communication network 116) with a data repository 310 storing the user preferences associated with the user profile collected at 204. The focus diversion program 110a, 110b may query the data repository 310 to retrieve the user-defined time parameter stored therein and may then compare the retrieved user-defined time parameter against the time duration of the focal attention calculated by the timing component.

In at least one embodiment, the focus diversion program 110a, 110b may implement a facial recognition component to analyze an image feed of the user audience from the camera of the user device and the facial images collected with the user preferences at 204 (e.g., using facial recognition capabilities) to recognize or identify the user audience in view of the camera of the user device. The facial recognition component may access (e.g., via communication network 116) the facial images or the pointers to the facial images (e.g., pointers to social network database) stored in the data repository 310 for comparison against the image feed from the camera of the user device. Based on the results of the facial recognition component, the focus diversion program 110a, 110b may determine if the user should be alerted of the user audience. In one embodiment, the focus diversion program 110a, 110b may recognize the user audience and, based on the user preferences stored in the data repository 310, may alert the user to the recognized user audience. In another embodiment, the focus diversion program 110a, 110b may recognize the user audience and, based on the user preferences stored in the data repository 310, may not alert the user to the recognized user audience (e.g., the recognized user audience is a younger sibling and the user listed the younger sibling as a person who may not disturb the user by triggering the alert). In at least one embodiment, the focus diversion program 110a, 110b may not recognize or identify the user audience (e.g., facial images or pointers to the facial images may not be stored in the data repository 310), and based on the user preferences stored in the data repository 310, may or may not alert the user of the unrecognized user audience (e.g., user preferences may include that user may or may not be alerted to an unrecognized user audience).

If the focus diversion program 110a, 110b determines that the user should not be alerted at 304, then the focus diversion program 110a, 110b continues to monitor the user environment at 306. In one embodiment, the focus diversion program 110a, 110b may implement the timing component to calculate the time duration of the focal attention of the user audience as detailed at 304. If the calculated time duration of the focal attention of the user audience is less than the user-defined time parameter stored in the data repository 310, the focus diversion program 110a, 110b may not alert the user of the user device and may continue to monitor the user environment at 306. The focus diversion program 110a, 110b may monitor the user environment via the camera of the user device in a manner similar to the process detailed at 302.

In one embodiment, the focus diversion program 110a, 110b may implement the facial recognition component to identify the user audience as detailed at 304. If the identified user audience is included in the user preferences (e.g., stored in the data repository 310) as a person who may not trigger the alert, the focus diversion program 110a, 110b may not alert the user of the user device and may continue to monitor the user environment at 306. If the user audience is unable to be identified using the facial recognition component as detailed at 304, and the user preferences (e.g., stored in the data repository 310) included that the user may not be alerted to an unidentified user audience, the focus diversion program 110a, 110b may not alert the user of the user device and may continue to monitor the user environment at 306.

Continuing with the previous example, after detecting the person X as the user audience at 302, the focus diversion program 110a, 110b implements the timing component to calculate the focal attention length of the person X. The focus diversion program 110a, 110b triggers the timing component to start the timer when the person X faces the front-facing camera of the mobile device of the user and triggers the timing component to stop the timer when the person X faces away from the front-facing camera of the mobile device of the user. The timing component calculates the time duration of the focal attention of the person X to be seven seconds.

Thereafter, the focus diversion program 110a, 110b transmits, via communication network 116, a query to the data repository 310 to retrieve the user-defined time parameter stored therein. Then, the focus diversion program 110a, 110b compares the retrieved user-defined time parameter of ten seconds against the calculated seven seconds time duration of the focal attention of the person X. Based on the comparison, the focus diversion program 110a, 110b determines that the time duration of the focal attention of the person X does not meet or satisfy the user-defined time parameter of ten seconds and, as such, the focus diversion program 110a, 110b does not alert the user of the mobile device to the person X and continues to monitor the user environment at 306. Accordingly, the user continues to interact with the gaming application running on the mobile device, uninterrupted by the focus diversion program 110a, 110b.

In one embodiment, the facial recognition component of the focus diversion program 110a, 110b analyzes an image feed of the person X from the front-facing camera of the mobile device and the pointers to facial images stored in the data repository 310 and identifies the person X as a younger sibling of the user of the mobile device. Based on the user preferences stored in the data repository 310, the focus diversion program 110a, 110b determines that the younger siblings of the user of the mobile device may not trigger the alerting mechanism. As such, the focus diversion program 110a, 110b does not alert the user of the mobile device to the younger sibling and continues to monitor the user environment at 306. Accordingly, the user continues to interact with the gaming application running on the mobile device, uninterrupted by the focus diversion program 110a, 110b.

If the focus diversion program 110a, 110b determines that the user should be alerted at 304, then the user is alerted at 308. The focus diversion program 110a, 110b may implement the timing component to calculate the time duration of the focal attention of the user audience as detailed at 304. If the calculated time duration of the focal attention of the user audience is at least equal to the user-defined time parameter stored in the data repository 310, the focus diversion program 110a, 110b may alert the user of the user device at 308 as indicated in the user preferences stored in the data repository 310. Specifically, the focus diversion program 110a, 110b may query (e.g., via communication network 116) the data repository 310 to determine the user-defined alerting mechanism (e.g., audio alert) recorded therein. Thereafter, the focus diversion program 110a, 110b may perform the user-defined alerting mechanism retrieved from the data repository 310 to alert the user of the detected user audience seeking to engage the user.

In one embodiment, the focus diversion program 110a, 110b may implement the facial recognition component to identify the user audience as detailed at 304. If the identified user audience is included in the user preferences (e.g., stored in the data repository 310) as a person who may trigger the alert, the focus diversion program 110a, 110b may alert the user of the user device at 308 as detailed above. If the user audience is unable to be identified using the facial recognition component as detailed at 304, and the user preferences (e.g., stored in the data repository 310) included that the user may be alerted to an unidentified user audience, the focus diversion program 110a, 110b may alert the user of the user device at 308 as detailed above.

Continuing with the previous example, after detecting the person X as the user audience at 302, the focus diversion program 110a, 110b implements the timing component to calculate the focal attention length of the person X as detailed above. The timing component calculates the focal attention length of the person X to be 11 seconds.

Thereafter, the focus diversion program 110a, 110b transmits, via communication network 116, a query to the data repository 310 to retrieve the user-defined time parameter stored therein. Then, the focus diversion program 110a, 110b compares the retrieved user-defined time parameter of ten seconds against the focal attention length of 11 seconds calculated by the timing component. Based on the comparison, the focus diversion program 110a, 110b determines that the focal attention length of the person X does meet or satisfy the user-defined time parameter of ten seconds, and as such, the focus diversion program 110a, 110b transmits, via communication network 116, a query to the data repository 310 to determine the user-defined alerting mechanism recorded therein. From the data repository 310, the focus diversion program 110a, 110b determines that audio alert is the user-defined alerting mechanism. Accordingly, the focus diversion program 110a, 110b engages one or more audio components of the mobile device to emit the audio alert while the user interacts with the gaming application running on the mobile device. As a result, the user is alerted by the focus diversion program 110a, 110b, that person X is seeking to engage the user.

Furthermore, the facial recognition component of the focus diversion program 110a, 110b analyzes an image feed of the person X from the front-facing camera of the mobile device and the pointers to facial images stored in the data repository 310 and identifies the person X as a grandparent of the user of the mobile device. Based on the user preferences stored in the data repository 310, the focus diversion program 110a, 110b determines that the grandparent of the user of the mobile device may trigger the alerting mechanism. As such, the focus diversion program 110a, 110b alerts the user of the mobile device as detailed above. Accordingly, the focus diversion program 110a, 110b emits audio from the mobile device to indicate that the grandparent of the user is seeking to engage the user.

As described herein, the focus diversion program 110a, 110b may run in the background of a mobile device (e.g., client computer 102) while a user digitally interacts with another program/application (e.g., software program 108) running in the foreground of the mobile device. The focus diversion program 110a, 110b may have the capacity to improve the technical field of mobile device user interfaces by employing a front-facing camera of the mobile device (e.g., camera on the back side of the mobile device) to constantly look ahead and monitor the environment in front of the user. When the focus diversion program 110a, 110b detects that a user audience is in view of the front-facing camera and is directing focal attention towards the user of the mobile device, the focus diversion program 110a, 110b may calculate a time duration of the focal attention of the user audience and determine if the calculated time duration of the focal attention meets a user-defined time parameter. If the user-defined time parameter is met, the focus diversion program 110a, 110b may implement the user interface of the mobile device to alert the user to the user audience seeking the attention of the user. The focus diversion program 110a, 110b may also implement facial recognition techniques to recognize a face in the user audience to determine whether alerts or indications may be generated in the mobile device to divert the focus of the user from the mobile device to the recognized audience seeking the attention of the user. Thus, the focus diversion program 110a, 110b may improve the functionality of a computer.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
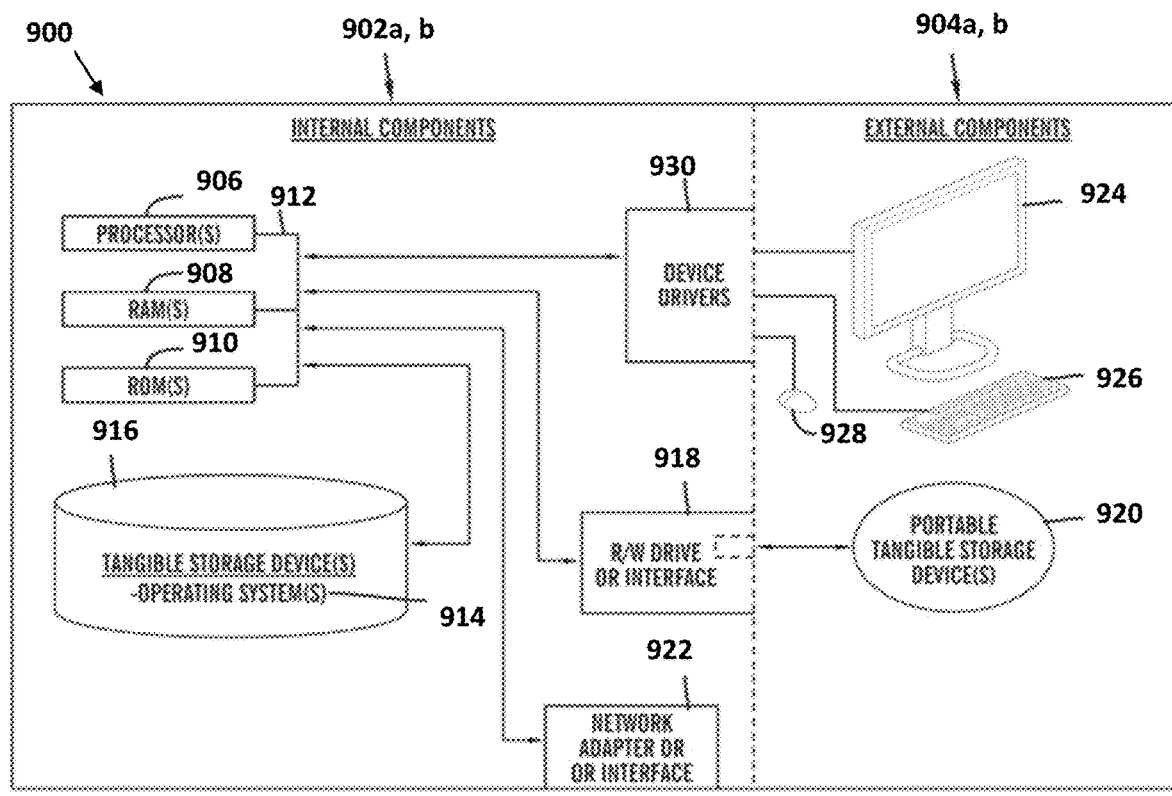
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the focus diversion program 110a in client computer 102, and the focus diversion program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the focus diversion program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the focus diversion program 110a in client computer 102 and the focus diversion program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the focus diversion program 110a in client computer 102 and the focus diversion program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
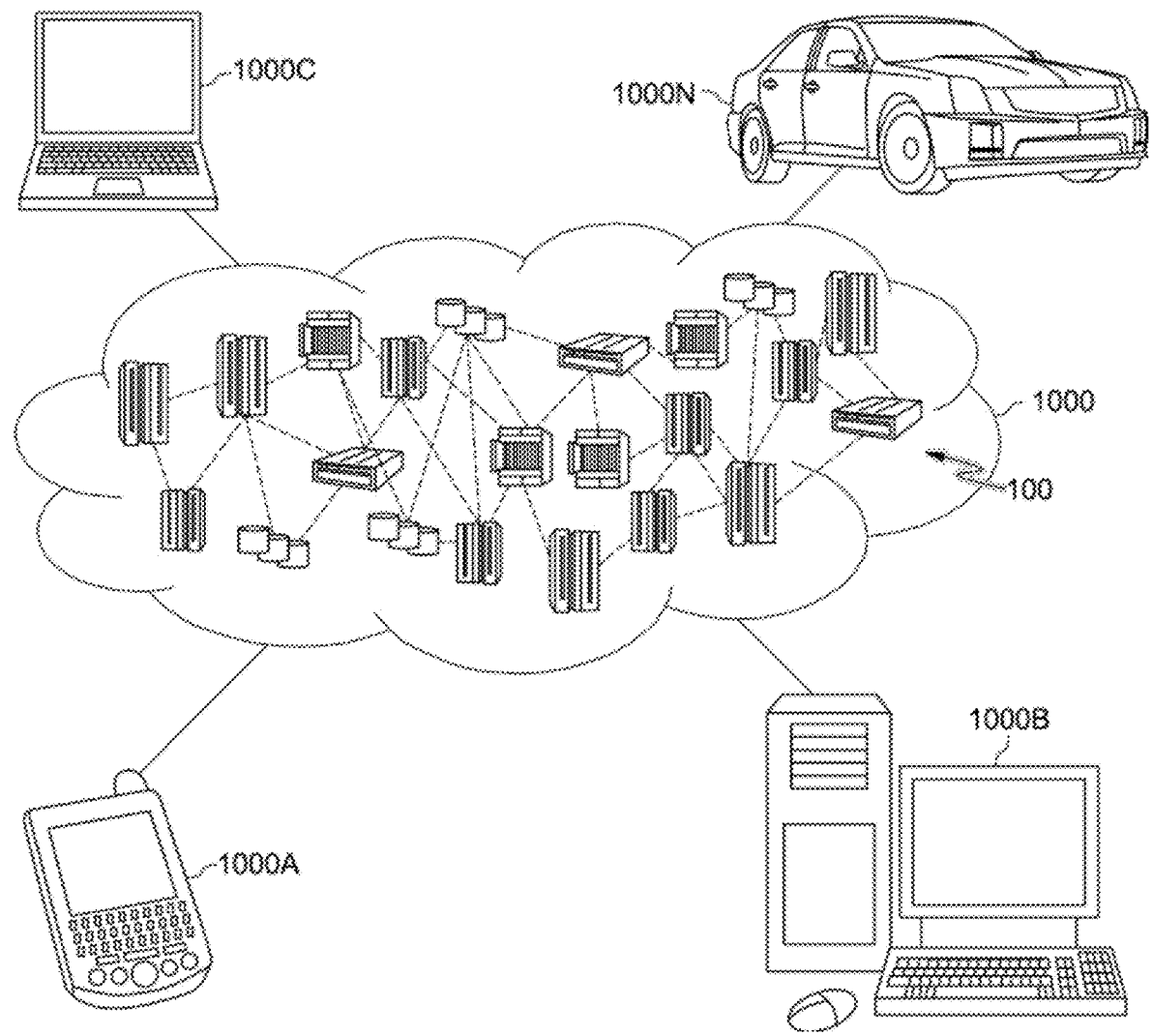
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
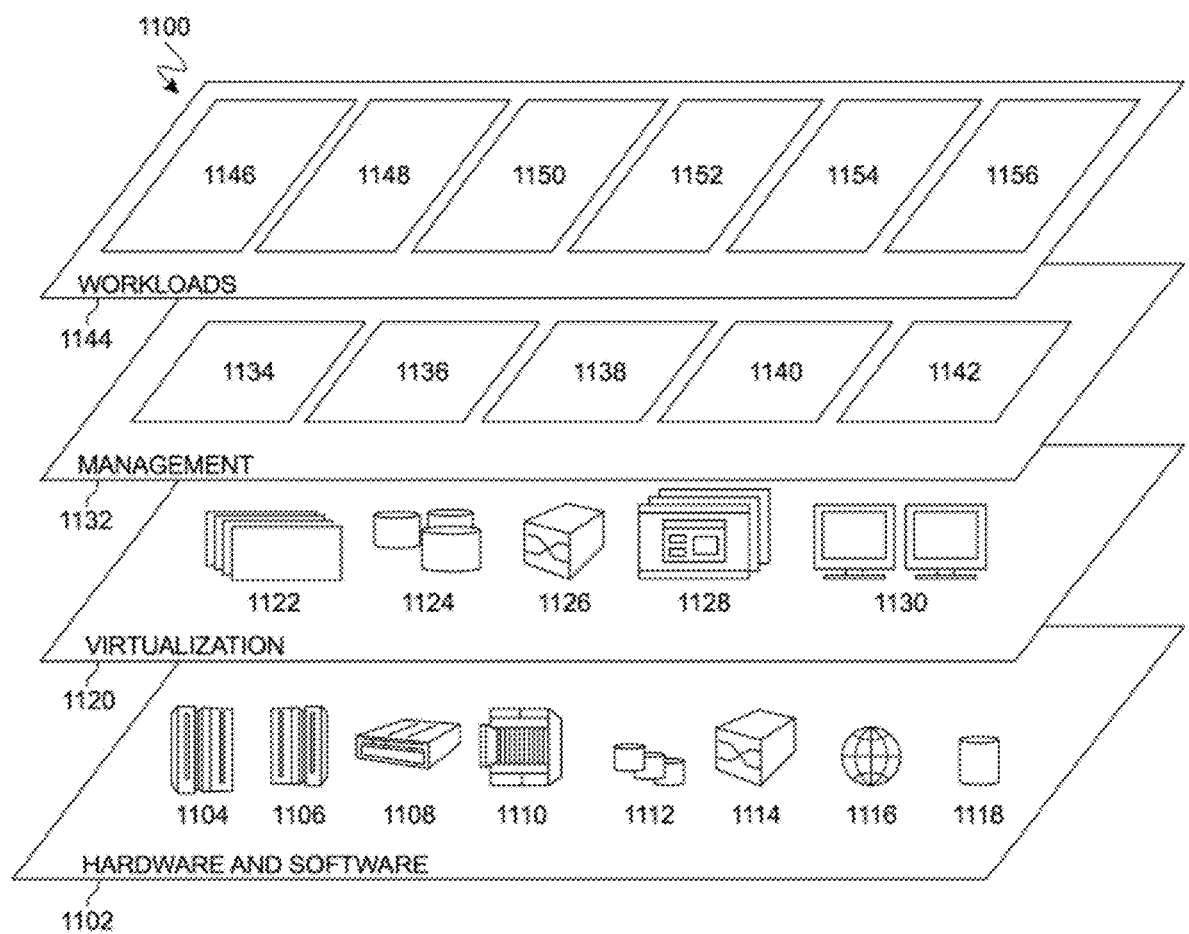
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and focus diversion 1156. A focus diversion program 110a, 110b provides a way to detect a user audience using a camera of the user device while the user is interacting with the user device and perform one or more alerts on the user device to direct the focus of the user to the audience seeking to engage the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for diverting a user focus from a user device, the method comprising:

detecting, using at least one gaze detection capability of a user device, a gaze of a user audience being directed towards the user device;

calculating a time duration of a focal attention of the user audience based on the detected gaze of the user audience;

identifying a user-defined time parameter stored in a data repository, wherein the identified user-defined time parameter is associated with a minimum time duration of the focal attention of the user audience;

comparing the calculated time duration of the focal attention of the user audience against the identified user-defined time parameter stored in the data repository; and in response to determining that the calculated time duration of the focal attention of the user audience meets the identified user-defined time parameter stored in the data repository, transmitting an alert from the user device configured to divert a user focus from the user device to the detected user audience.

2. The method of claim 1, further comprising:

in response to the user interacting with the user device, monitoring, using a camera associated with the user device, an environment in front of the user;

detecting a potential user audience in view of the camera associated with the user device; and in response to determining a focal attention of the detected potential user audience being directed towards the user, identifying the detected potential user audience as the detected user audience.

3. The method of claim 1, further comprising:

recognizing, using at least one facial recognition capability of the user device, a face of the user audience in proximity of the user device;

identifying at least one user preference stored in a data repository, wherein the at least one identified user preference includes a first user preference associated with the recognized face of the user audience in proximity of the user device; and determining that the user of the user device should be alerted to the detected user audience based on the first user preference associated with the recognized face of the user audience.

4. The method of claim 1, wherein the transmitted alert is selected from the group consisting of: vibrating the user device, emitting an audio alert from the user device, displaying a video indicator on the user device, and displaying a popup window on the user device.

5. The method of claim 1, wherein transmitting the alert from the user device configured to divert the user focus from the user device to the detected user audience further comprises:

recognizing, using at least one facial recognition capability of the user device, a first user audience in the detected user audience in proximity of the user device;

identifying a first audience-specific alert stored in a data repository, wherein the identified first audience-specific alert is associated with the recognized first user audience; and in response to identifying the first audience-specific alert stored in the data repository, performing, using the user device, the identified first audience-specific alert, wherein the performed first audience-specific alert is configured to alert the user to the first user audience in proximity of the user device.

6. The method of claim 1, wherein detecting the user audience in proximity of the user device further comprises:

in response to the user digitally interacting with a screen on a front side of a mobile device, implementing a front-facing camera on a back side of the mobile device to monitor an environment in front of the user; and detecting, using the implemented front-facing camera on the back side of the mobile device, the user audience gazing towards the user of the mobile device.

7. A computer system for diverting a user focus from a user device, comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

detecting, using at least one gaze detection capability of a user device, a gaze of a user audience being directed towards the user device;

calculating a time duration of a focal attention of the user audience based on the detected gaze of the user audience;

identifying a user-defined time parameter stored in a data repository, wherein the identified user-defined time parameter is associated with a minimum time duration of the focal attention of the user audience;

comparing the calculated time duration of the focal attention of the user audience against the identified user-defined time parameter stored in the data repository; and in response to determining that the calculated time duration of the focal attention of the user audience meets the identified user-defined time parameter stored in the data repository, transmitting an alert from the user device configured to divert a user focus from the user device to the detected user audience.

8. The computer system of claim 7, further comprising:

in response to the user interacting with the user device, monitoring, using a camera associated with the user device, an environment in front of the user;

detecting a potential user audience in view of the camera associated with the user device; and in response to determining a focal attention of the detected potential user audience being directed towards the user, identifying the detected potential user audience as the detected user audience.

9. The computer system of claim 7, further comprising:

recognizing, using at least one facial recognition capability of the user device, a face of the user audience in proximity of the user device;

identifying at least one user preference stored in a data repository, wherein the at least one identified user preference includes a first user preference associated with the recognized face of the user audience in proximity of the user device; and determining that the user of the user device should be alerted to the detected user audience based on the first user preference associated with the recognized face of the user audience.

10. The computer system of claim 7, wherein transmitting the alert from the user device configured to divert the user focus from the user device to the detected user audience further comprises:

recognizing, using at least one facial recognition capability of the user device, a first user audience in the detected user audience in proximity of the user device;

identifying a first audience-specific alert stored in a data repository, wherein the identified first audience-specific alert is associated with the recognized first user audience; and in response to identifying the first audience-specific alert stored in the data repository, performing, using the user device, the identified first audience-specific alert, wherein the performed first audience-specific alert is configured to alert the user to the first user audience in proximity of the user device.

11. The computer system of claim 7, wherein detecting the user audience in proximity of the user device further comprises:

in response to the user digitally interacting with a screen on a front side of a mobile device, implementing a front-facing camera on a back side of the mobile device to monitor an environment in front of the user; and detecting, using the implemented front-facing camera on the back side of the mobile device, the user audience gazing towards the user of the mobile device.

12. A computer program product for diverting a user focus from a user device, comprising:
   one or more computer-readable tangible storage media and program instructions stored on at least one of the one or more computer-readable tangible storage media, the program instructions executable by a processor to cause the processor to perform a method comprising:
   detecting, using at least one gaze detection capability of a user device, a gaze of a user audience being directed towards the user device;
   calculating a time duration of a focal attention of the user audience based on the detected gaze of the user audience;
   identifying a user-defined time parameter stored in a data repository, wherein the identified user-defined time parameter is associated with a minimum time duration of the focal attention of the user audience;
   comparing the calculated time duration of the focal attention of the user audience against the identified user-defined time parameter stored in the data repository; and
   in response to determining that the calculated time duration of the focal attention of the user audience meets the identified user-defined time parameter stored in the data repository, transmitting an alert from the user device configured to divert a user focus from the user device to the detected user audience.

13. The computer program product of claim 12, further comprising:
   in response to the user interacting with the user device, monitoring, using a camera associated with the user device, an environment in front of the user;
   detecting a potential user audience in view of the camera associated with the user device; and
   in response to determining a focal attention of the detected potential user audience being directed towards the user, identifying the detected potential user audience as the detected user audience.

14. The computer program product of claim 12, further comprising:
   recognizing, using at least one facial recognition capability of the user device, a face of the user audience in proximity of the user device;
   identifying at least one user preference stored in a data repository, wherein the at least one identified user preference includes a first user preference associated with the recognized face of the user audience in proximity of the user device; and
   determining that the user of the user device should be alerted to the detected user audience based on the first user preference associated with the recognized face of the user audience.

15. The computer program product of claim 12, wherein the transmitted alert is selected from the group consisting of: vibrating the user device, emitting an audio alert from the user device, displaying a video indicator on the user device, and displaying a popup window on the user device.

16. The computer program product of claim 12, wherein transmitting the alert from the user device configured to divert the user focus from the user device to the detected user audience further comprises:
   recognizing, using at least one facial recognition capability of the user device, a first user audience in the detected user audience in proximity of the user device;
   identifying a first audience-specific alert stored in a data repository, wherein the identified first audience-specific alert is associated with the recognized first user audience; and
   in response to identifying the first audience-specific alert stored in the data repository, performing, using the user device, the identified first audience-specific alert, wherein the performed first audience-specific alert is configured to alert the user to the first user audience in proximity of the user device.

17. The computer program product of claim 12, wherein detecting the user audience in proximity of the user device further comprises:
   in response to the user digitally interacting with a screen on a front side of a mobile device, implementing a front-facing camera on a back side of the mobile device to monitor an environment in front of the user; and
   detecting, using the implemented front-facing camera on the back side of the mobile device, the user audience gazing towards the user of the mobile device.

* * * * *